United States Patent [19]

Kimbara et al.

[11] 3,872,841
[45] Mar. 25, 1975

[54] CONSTRUCTION ARRANGEMENT OF COMBUSTION CHAMBER FOR USE IN DIRECT FUEL INJECTION TYPE DIESEL ENGINES

[75] Inventors: Motoyasu Kimbara, Yokohoma; Yoshitaka Yoshida, Tokyo, both of Japan

[73] Assignee: Isuzu Motors Limited, Tokyo, Japan

[22] Filed: Aug. 24, 1973

[21] Appl. No.: 391,365

[30] Foreign Application Priority Data

Aug. 25, 1972 Japan.............................. 47-85156
Aug. 25, 1972 Japan.............................. 47-85157
Aug. 25, 1972 Japan.............................. 47-85158

[52] U.S. Cl. .......... 123/32 A, 123/32 R, 123/32 ST, 123/193 P
[51] Int. Cl. .......................... F02b 23/06, F02f 3/14
[58] Field of Search ............ 123/32 A, 32 R, 193 P, 123/32 ST

[56] References Cited
UNITED STATES PATENTS

| | | | |
|---|---|---|---|
| 2,828,724 | 4/1958 | Schneider | 123/32 A |
| 2,855,906 | 10/1958 | Galli | 123/32 R |
| 3,083,700 | 4/1963 | Madak et al. | 123/32 A |
| 3,302,627 | 2/1967 | Morris | 123/32 A X |
| 3,814,068 | 6/1974 | Kimbara et al. | 123/32 A |

FOREIGN PATENTS OR APPLICATIONS

495,540    6/1954    Italy................................ 123/32 A

*Primary Examiner*—Charles J. Myhre
*Assistant Examiner*—Tony Argenbright
*Attorney, Agent, or Firm*—Sughrue, Rothwell, Mion, Zinn & Macpeak

[57] ABSTRACT

Herein disclosed are the construction arrangements of a combustion chamber for use in a direct fuel injection type Diesel engine. The combustion chamber is defined by a cylinder liner, a cylinder liner head and a piston being slidable within said cylinder and having a cavity at its crown portion. Means effect swirling motion in the combustion chamber, and a fuel injection nozzle is so attached at a cylinder head that its tip portion is disposed at the upper portion of the combustion chamber at the center of the cavity and has four or eight orifices being open so as to timely inject a metered fuel jet into the combustion chamber. According to a primary feature of the present invention, said cavity has the inner peripheral wall surface comprised of four flat inner side wall surfaces, each being in a straight line having the same length in its horizontal cross-section and respective adjacent straight lines being perpendicular to each other, and four inner corner wall surfaces, each being arcuate in its horizontal cross-section and being interposed between respective adjacent inner side wall surfaces and being so formed that the ratio of the radius of the corner wall surface to that of a circle, which is inscribed with said inner side wall surfaces, is the range of from 0.40 to 0.75. According to a secondary feature, the fuel injection direction of each of said orifices is so defined that fuel is injected from each orifice to the inner peripheral wall surface of the cavity at an angle excepting the range of from 40° to 55° extended from a straight line as a datum line, which is drawn between the center of the inscribed circle and a reference point which is defined by extending two edge lines of adjacent inner side wall surfaces, in the reverse direction to that of said swirling motion.

3 Claims, 9 Drawing Figures

PATENTED MAR 25 1975　　3,872,841

CONSTRUCTION ARRANGEMENT OF COMBUSTION CHAMBER FOR USE IN DIRECT FUEL INJECTION TYPE DIESEL ENGINES

BACKGROUND OF THE INVENTION

1. Field of the Invention

The present invention relates to a direct fuel injection type Diesel engine, and more particularly, to the construction arrangement of a combustion chamber for use in the Diesel engine.

2. Description of the Prior Art

A combustion chamber of a conventional Diesel engine of direct fuel injection type is, as shown in FIGS. 1A and 1B of the accompanying drawings, composed mostly of a cavity C, which is formed in a crown portion of a piston P, and partially of a space which is defined by the crown portion of the piston P, a cylinder head H and a cylinder liner L. The plane or horizontal cross-sectional view of the cavity C is in a general circle, and a fuel injection nozzle N is attached to the cylinder head and its tip portion is positioned at the upper portion of the combustion chamber on the center of the cavity. At the tip portion of the nozzle N, a plurality of orifices O open radially so as to timely inject metered fuel jets into the inner peripheral wall surface W of the cavity.

In order to improve distribution and/or atomization of the injected fuel and to promote mixing of the fuel with suction air, there is provided in the cavity C a conventional means such as a helical port, a directional port or a shroud valve which acts to effect swirling motion S to the suction air.

In such a circular cavity C, the fuel jet, which is injected from the orifices O of the nozzle, is distributed and atomized in such a fasion as shown in FIG. 2. More specifically, a fuel main jet F emanating from the orifices O of the nozzle N will impinge upon the inner peripheral wall W of the cavity C and then be divided into a reflected flow $f'$ at the trailing or downstream side and into a reflected fuel flow $f''$ at the leading or upstream side in respect of the direction of the swirling motion S. Under such condition, the upstream reflected fuel flow $f''$ has a tendency to be intrained by the swirling motion S to thereby flow into the main jet F. The downstream flow $f'$ has, on the contrary, a tendency to be entrained by the swirling motion S to such an extent to catch the adjacent upstream reflected fuel flow. As a result, an over-rich mixture is locally produced where the two reflected fuel flows coming from the two orifices adjacent to each other flow into each other, whereas an excessively lean mixture is locally produced in a region excepting the above region with the over-rich mixture. Thus, the resultant distribution and atomization of the fuel will accordingly be deteriorated. In order to obviate this deterioration in fuel mixing, a proposal has been made and put into practice, in which the intensity of the swirling motion S is enhanced. Even with the non-intensified swirling motion S, however, some region has a mixture of a proper air-fuel ration suitable for initiating combustion. If, therefore, the swirling motion S is intensified for improving the fuel distribution and atomization, then a sudden combustion takes place locally at the region having a mixture of a proper ratio. This sudden combustion will produce locally hot spots, in which a large amount of nitrogen oxides ($NO_x$) is produced. The $NO_x$ thus produced will then be discharged from the exhaust system of the Diesel engine under consideration. Where, on the other hand, the swirling motion S is strong, the inverse squish Q phenomenon, which may be experienced after the piston P passes the top dead center, cannot be effectively used to trap the injected fuel in the cavity C and a thermal pinch is caused thereby. This will lead to the greater deterioration in the combustion in the combustion chamber.

As will be easily understood, on the other hand, if the swirling motion S is excessively weak, the fuel main jet F and the reflected fuel flows $f'$ and $f''$ cannot spread far and wide in the cavity C. Then, the fuel cannot accordingly be distributed nor atomized so that it cannot be admixed with the suction air sufficiently. This is accompanied by deterioration in combustion, which undesirably leads to reduction in output power and to increase in noxious exhaust emission such as carbon monoxide (CO), hydrocarbons (HC) or soot. Still the worse, since the intensity of the swirling motion S is increased with the increase in the engine speed, a swirling motion S having a proper intensity for an engine speed may not always be proper for another engine speed.

SUMMARY OF THE INVENTION

It is, therefore, a primary object of the present invention to provide the construction arrangement of a combustion chamber for use in a Diesel engine of the direct fuel injection type, in which the above-described drawbacks concomitant with that of conventional combustion chambers, such as having a general circle in its plan or horizontal cross-sectional view, are eliminated.

Another object of the invention is to provide the construction arrangement of a combustion chamber of the above type Diesel engine in which a cavity occupying a major portion of the combustion chamber has a square-like contour so that a frictional resistance to a swirling motion of the suction air is produced to control the intensity of the swirling motion in a manner proportional to the engine speed, so that the emission of $NO_x$ in the engine exhause gases, which might otherwise be increased with increase in the particular intensity, can be decreased.

A further object is to provide a combustion chamber structure of the above type Diesel engine, in which a fuel main jet is so injected into the combustion chamber that it impinges at a predetermined injection angle upon inner peripheral wall surfaces of the cavity, so that the reflection of the main jet from each inner peripheral wall surface can be efficiently used to improve the distribution and/or atomization of the fuel without excessively intensifying the swirling motion of the suction air and to thereby obtain a combustible mixture having a proper air-fuel ratio. Thus, the Diesel engine with the present combustion chamber structure can enjoy minimized noxious exhause emission such as carbon monoxide (CO), hydrocarbons (HC) or soot. The Diesel engine can also enjoy quick and smooth starting, quiet running and high performance.

SUMMARY OF THE INVENTION

In order to practice the above described objects, the present invention provides the following improved construction arrangement of the combustion chamber for use in a direct fuel injection type Diesel engine. Namely;

In a combustion chamber for use in a Diesel engine of the direct fuel injection type which is defined by liner and cylinder head, a piston slidable within said cylinder liner and having a cavity at its crown portion, means for effecting swirling motion in said combustion chamber, and a fuel injection nozzle so attached at a cylinder head that its tip portion is disposed at the upper portion of the combustion chamber at the center of the cavity and having orifices being so open as to timely inject a metered fuel jet into said combustion chamber, the improvement characterized in that said cavity has the inner peripheral wall surface comprising four flat inner side wall surfaces, each being linear having the same length in its horizontal cross-section and respective linear surfaces adjacent to each other being perpendicular to each other, and four inner corner wall surfaces, each being in substantially arcuate in its horizontal cross-section and being interposed between respective inner side wall surfaces adjacent to each other and being so formed that the ratio of the radius of the arcuate corner wall surfaces to that of a circle, which is inscribed with said inner side wall surfaces, is in the range of from 0.40 to 0.75, and that the fuel injection direction of each of said orifices is so defined that fuel is injected from each orifice to the inner peripheral wall surface at an slant angle within the range expecting that of from 40° to 55° extended from a straight line as a datum line, which is drawn between the center of the inscribed circle and a reference point which is defined by extending two edge lines of said inner side wall surfaces adjacent to each other, in the reverse direction to that of said swirling mortion.

BRIEF DESCRIPTION OF THE DRAWINGS

Other objects, features and advantages of the present invention will be apparent from the following description taken in conjunction with the accompanying drawings, in which.

DESCRIPTION OF THE PREFERRED EMBODIMENTS

Figure 3A:
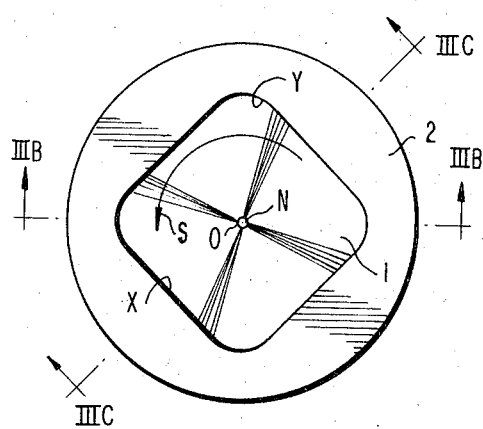
FIG. 3A is a top plan view showing a combustion chamber of the present invention having a square-like cavity at a piston crown portion.
Figure 3B:
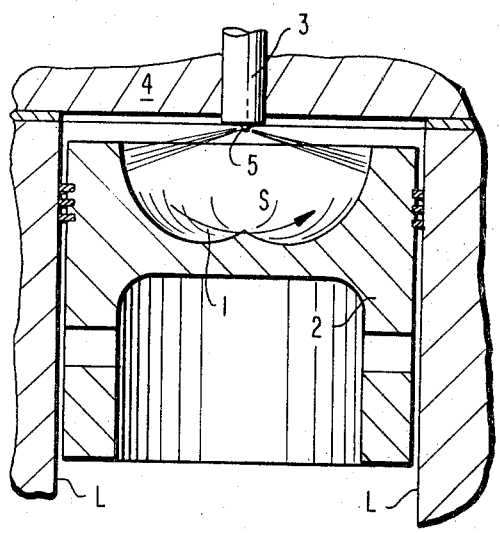
FIG. 3B is a longitudinal cross sectional view of the combustion chamber of the present invention taken along the line IIIB—IIIB in FIG. 3A.

The present invention will now be described with reference to FIGS. 3A and 3B. As shown, a cavity 1 which is formed at a crown portion of a piston 2 is of square-like shape in its plan view or horizontal cross sectional view. The cavity has the inner peripheral wall surface comprising four flat inner side wall surfaces X, each being in a straight line having the same length in its horizontal cross section with two respective straight lines adjacent to each other being perpendicular to each other, and four inner corner wall surfaces Y, each being substantially in an arc in its horizontal cross section and being interposed between respective adjacent inner side wall surface. A fuel injection nozzle 3 may be so attached at a cylinder head 4 that its tip portion is disposed at the upper portion in the combustion chamber on the center of the cavity 1. The tip portion of the nozzle 3 is symmetrically provided with either four or eight orifices 5 which open radially into the combustion chamber as to timely inject metered fuel jets into the cavity 1 toward the inner peripheral wall surface thereof.

Figure 1A:
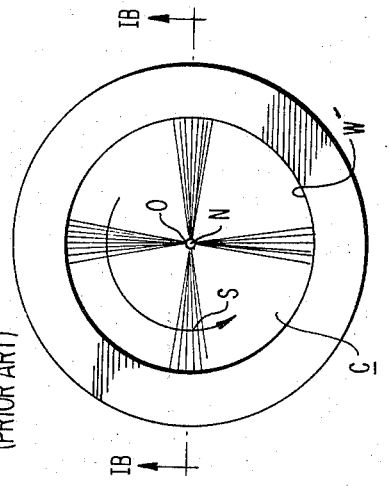
FIG. 1A is a top plan view showing a conventional combustion chamber having a circular cavity at a piston crown portion.
Figure 1B:
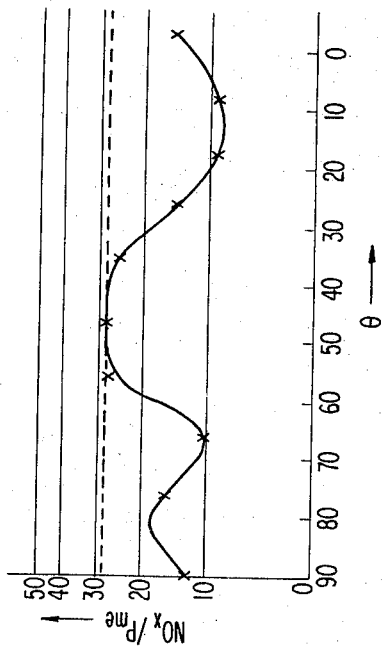
FIG. 1B is a longitudinal cross sectional view of the conventional combustion chamber taken along the line IB-IB in FIG. 1A.
Figure 4:
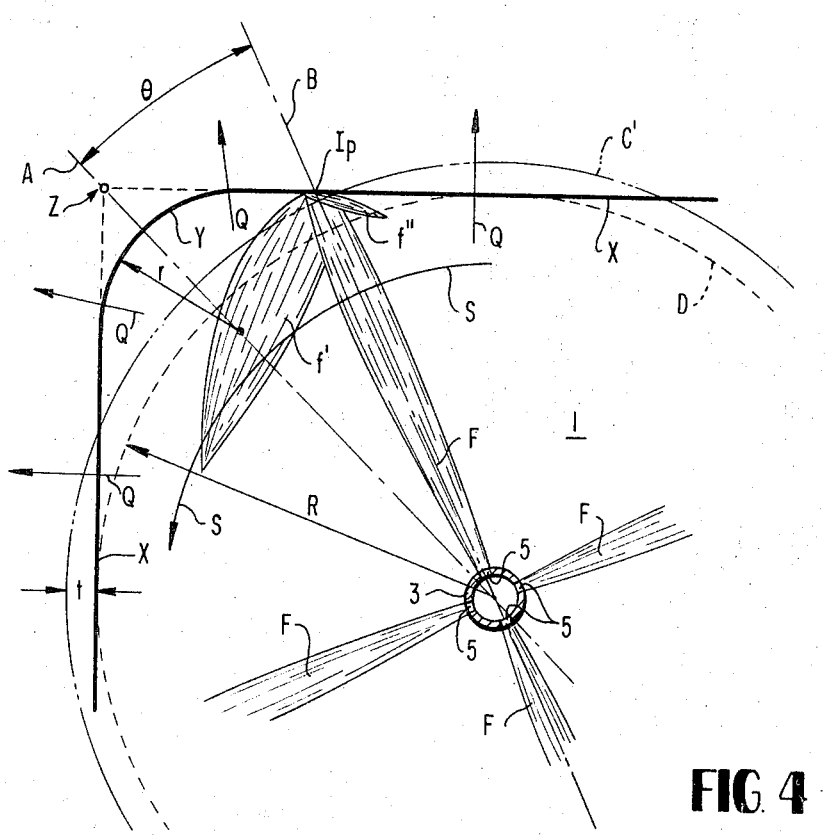
FIG. 4 is a diagrammatical view showing an partially enlarged portion of FIG. 3A.
Figure 3C:
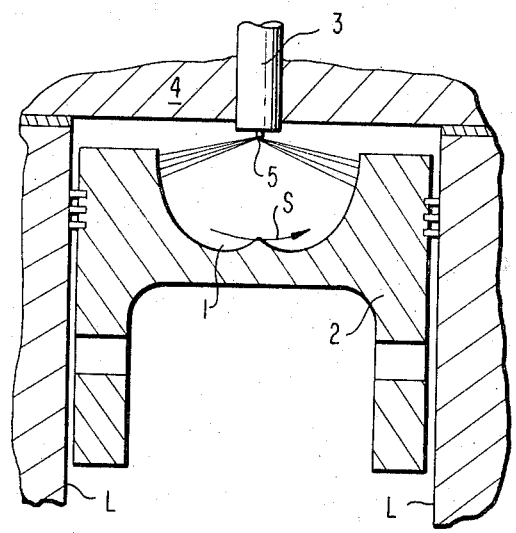
FIG. 3C is a longitudinal cross sectional view of the present invention taken along the line IIIC—IIIC in FIG. 3A.

The detailed description of the present invention will be made in connection with FIG. 4, in which a circle D inscribed with the inner side wall surfaces X as indicated by a dotted line and in which the radius of the inscribed circle D is indicated by a reference letter R. Indicated by a reference letter r is, on the other hand, a radius of the inner corner wall surfaces Y. The ratio of the latter radius r to the former radius R is set in the present invention to fall within a predetermined range, that is, a range from 0.4 to 0.75. In comparison with the contour of such square cavity 1 of the invention, a conventional circular cavity C', which has the same volume as that of the present cavity 1 and is indicated by a two-points-chain line in FIG. 4, is radially outwardly convex at the portions corresponding to the inner corner wall surface Y and radially inwardly concave by a distance t at the portions corresponding to the respective center portions of the inner side wall surfaces X. This inwardly convex portions will act an obstacle to the swirling mations S as already explained in the foregoing paragraph of BACKGROUND OF THE INVENTION taken in conjunction with FIGS. 1A and 1B.

In the present square-like cavity 1 thus formed, therefore, if the intensity of the swirling motion S is present at a suitable level for a low speed condition of the engine, a frictional force, which has its intensity increased with the increase in the engine speed, is established in the vicinity of the flat inner side wall surfaces Z and is applied to the adjacent outermost portion of the swirling motion S. This frictional force will block or attenuate the swirling motion S. In accordance with the gas dynamics, it can be estimated that the attenuating action of the swirling motion S is proportional to the speed of the swirling motion S. With these in mind, it will be easily understood that, since the greater the swirling motion S is emphasized by the increase of the engine speed, the greater in effect, the inner side wall surface X becomes, and the swirling motion S itself is accordingly intensified. Thus, the distributing and atomizing operation of the fuel jet by the action of the swirling motion S can be maintained substantially at a proper level without being influenced by the engine speed. This will be reflected by the minimization of the $NO_x$ emission, which might other wise be increased with the increase of the swirling motion S as has been described in the beforehand.

Figure 5:
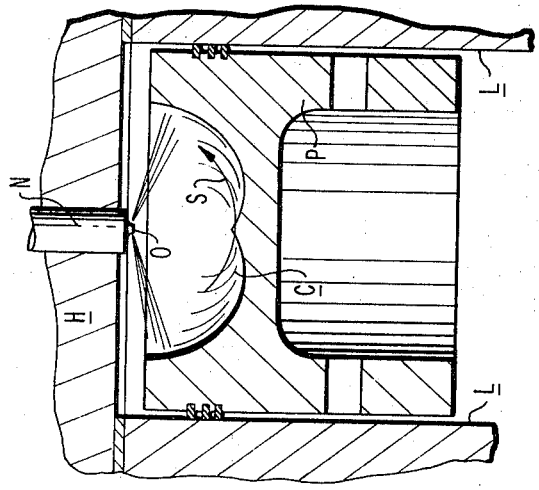
FIG. 5 is a graphical presentation of engine performance in the combustion chamber of the present invention.

A major factor having a essential influence on the attenuation of the swirling motion S is revealed to be the radius ratio r/R of the radius r of the corner wall surface Y to the radius R of the inscribed circle D. A proper level of this radius ratio r/R can be empirically obtained, as shown in FIG. 5, in which one of the measures of the engine performance is plotted against the radius ratio r/R. This measure is such a value (ppm/$P_{me}$) of $NO_x$ content (ppm) in the engine exhaust gases as divided by the engine output power which is expressed in terms of a mean effective pressure ($P_{me}$). For comparative purposes only, another engine performance is also plotted in a broken line for the conventional circular cavity. From these graphical presentations, it will be apparent that the engine performance under discussion is drastically improved when the radius ratio r/R falls within a range from 0.4 to 0.75. This implies that, when the above ranges are selected for the radius ratio, tha attenuation of the swirling motion is effectively carried out to promote the distribution and atomization of the fuel jets, so that the engine output power is increased and that the minimization of the $NO_x$ emission is also accomplished. Here, the experiments under consideration have been conducted with the engine speed being constant and with the combustion chamber where a fuel injection angle is also constant, which will be discussed in more detail in the following. And, the ordinate of FIG. 5 is expressed in a logarithmic manner.

Figure 2:
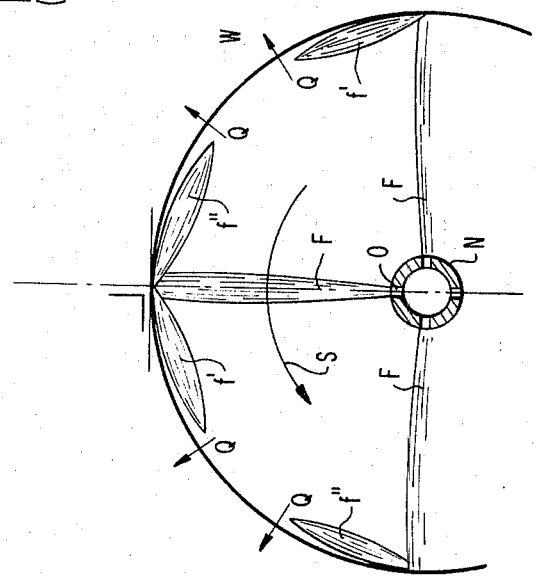
FIG. 2 is a diagrammatical view showing a partially enlarged portion of FIG. 1A.

Another series of experiments have been conducted to inspect what influence the injection angle of the fuel jet has on the engine performance for the combustion chamber structure having the square-like cavity. Reverting now to FIG. 4, a reference point Z at which the extensions of any two edge lines of the inner side wall surfaces X adjacent to each other intersect with each other is connected with the center of the cavity 1 or the inscribed circle D to form a reference line A as indicated by a point-chain line. Then, the fuel main jet F emanating from one of the orifices 5 of the nozzle impinges upon an impinging point Ip of one of the inner peripheral wall surface. Thus, another reference line B can be obtained which will connected the impinging point Ip with the center of the inscribed circle D. From these considerations, a fuel injection angle $\theta$ can be dictated in the direction reverse to that of swirling motion S by angular displacement between the two reference lines A and B, that is, by an angular displacement about the center of the inscribed circle between the reference point Z and the impinging point Ip. The experiments thus far conducted for inspecting how the variation in the injection angle $\theta$ has influence on the engine performance will be discussed with reference to FIG. 6. In view of the graphical presentations of the figure, it can be pointed out that such a range of the fuel injection angle $\theta$ as from 40° to 55° will cause the fuel main jet F to impinge against the inner peripheral wall surfaces at about the right angles therewith. As a result, the reflected flows $f'$ and $f''$ will accordingly be produced as has been discussed for the circular cavity of FIG. 2, so that the distribution and atomization of the fuel jet cannot be improved so much. If, therefore, the arrangement of the nozzle 3 is not so defined that each orifice has the above-specified fuel injection angle $\theta$, the effects to be obtained by forming the shape of the cavity 1 in square-like, that is, having the flat inner side wall surfaces X will be offset. It should be noted here that the reason why the range of the injection angle $\theta$, for example, $\theta=45°\pm5°$, to be excepted is not symmetrical with respect to the inner side wall surfaces X is considered to result from the existence of the swirling motion S.

When the fuel jets F is injected from the orificies 5 at the fuel injection angle $\theta$ within the range except the above specified range, 40° to 55°, therefore, the downstream reflected fuel flow $f'$ is larger than the upstream one $f''$ after it impinges the inner peripheral wall surface of the cavity. By the action of the swirling motion S, moreover, the reflected fuel flows will be sufficiently spread to improve the overall distribution and atomization of the injected fuel. In addition to this, the air or fuel droplets which are stagnant in the vicinity of the inner corner wall surfaces Y will not be trapped by the swirling motion S, so that the fuel droplets in the cavity 1 will be drawn by the inverse squish Q to spread around in the combustion chamber. Thus, the resultant distribution and atomization of the fuel jets can be so improved as to ensure sufficient mixing between the suction air and the injected fuel. As a result, the engine performance including minimization of the $NO_x$ emission is obtained.

Figure 6:
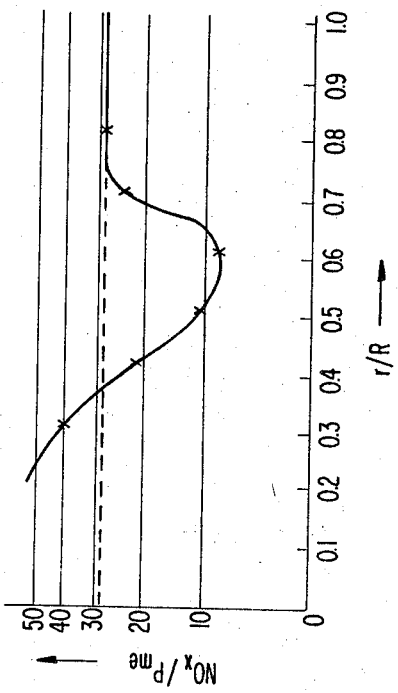
FIG. 6 is a graphical presentation of the engine performance against another factor in the combustion chamber of the present invention.

Especially in connection with the square cavity of the present invention, the excellent engine performance is obtained over a particularly wide range, namely, in the range from 5° to 25° of the fuel injection angle $\theta$ as clear from FIG. 6, which in turn implies that with a considerable fluctuation in the particular angle $\theta$ the engine performance will not be deteriorated so much if the angle $\theta$ falls on the above-specified range of 5° to 25°. This should be appreciated in that engines having substantially the same performance can be mass-produced without requiring severe accuracy in the production and assembly of the engine.

In consideration of the relative positions of the intake valve or the exhaust valve to be mounted in the cylinder head 4, on the other hand, the fuel injection nozzle 3 may often be required to be dislocated from the upper portion of the combustion camber on the center of the cavity 1. The present invention can, however, meet this requirement by having the orifices "5" of the nozzle 3 open in the upper portion of the combustion chamber on the center of the cavity 1. The allowance in the dislocation of the nozzle 3 is found to meet this requirement sufficiently if the dislocation is within 15 percent of the radius of the inscribed circle R.

What is claimed is:

1. In a combustion chamber for use in a Diesel engine of the direct fuel injection type which is defined by a cylinder liner, a cylinder head, a piston being slidable within said cylinder liner and having a cavity at its crown portion, and having means for effecting air swirling in said cavity, and a fuel injection nozzle so attached at a cylinder head that its tip portion is disposed at the upper portion of the combustion chamber at the center of said cavity and having a plurality of orifices so as to timely inject metered fuel jets into said cavity from said orifices radially against said cavity wall, the improvement wherein: said cavity has its inner peripheral wall surface formed by four inner side wall surfaces, each being in a straight line and of the same length in its horizontal cross-section with respective two straight lines adjacent to each other being perpendicular to each other, and four inner corner wall surfaces, each being in a substantially arc in its horizontal cross-section and being interposed between respective two inner side wall surfaces adjacent to each other and being so formed that the ratio of the radius of the arc to that of a circle, which is inscribed with said wall surfaces, is within the range of from 0.40 to 0.75, and wherein: the fuel injection direction of each of said orifices is so defined that fuel is injected from each orifice to said straight line peripheral wall surface of said cavity at a slant angle with respect to each side wall surface in the horizontal plane at the point of contact.

2. The combustion chamber according to claim 1, wherein said slant angle of the fuel injection direction of each orifice is in the range excepting that of from 40° to 55°; extending from a straight line as a datum line, which is drawn between the center of the inscribed circle and a reference point which is defined by extending two edge lines of said adjacent inner side wall surfaces, in the reverse direction to that of said swirling motion.

3. The combustion chamber according to claim 2, wherein said angle of the fuel injection direction of each orifice is in the range of from 5° to 25° extended from said datum line in the reverse direction to that of said swirling mortion.

* * * * *